United States Patent [19]
Darlinger et al.

[11] 3,834,129
[45] Sept. 10, 1974

[54] ABSORPTION OPTIMIZATION APPARATUS

[76] Inventors: Edward P. Darlinger, 693 Robinson Ave., Barberton, Ohio 44203; William Downs, 3945 S. Mahoning Ave.; Jack F. Stewart, 88 Overlook Dr., both of Alliance, Ohio 44601

[22] Filed: Sept. 13, 1972

[21] Appl. No.: 288,842

[52] U.S. Cl................ 55/242, 55/259, 55/260, 261/DIG. 54, 261/117, 423/242
[51] Int. Cl............................................ B01d 47/06
[58] Field of Search.................. 55/73–94, 228, 55/223, 233, 240, 241, 242, 259, 260; 261/DIG. 54, 115–118, 257; 423/242, 243

[56] References Cited
UNITED STATES PATENTS
| | | | |
|---|---|---|---|
| 3,420,508 | 1/1969 | Hurst et al. | 261/DIG. 54 |
| 3,439,724 | 4/1969 | Mason | 55/223 |
| 3,615,165 | 10/1971 | Clement | 423/242 |

FOREIGN PATENTS OR APPLICATIONS
| | | | |
|---|---|---|---|
| 562,547 | 9/1923 | France | 261/DIG. 11 |
| 678,139 | 5/1931 | France | 261/114 |

Primary Examiner—Bernard Nozick

[57] ABSTRACT

A wet scrubbing module for removal of particulate matter and gaseous sulphur oxides from flue gases where the liquid effluents from particulate removal and gaseous sulphur oxide absorbtion is separated to minimize intermixing of the wet scrubbing materials.

7 Claims, 4 Drawing Figures

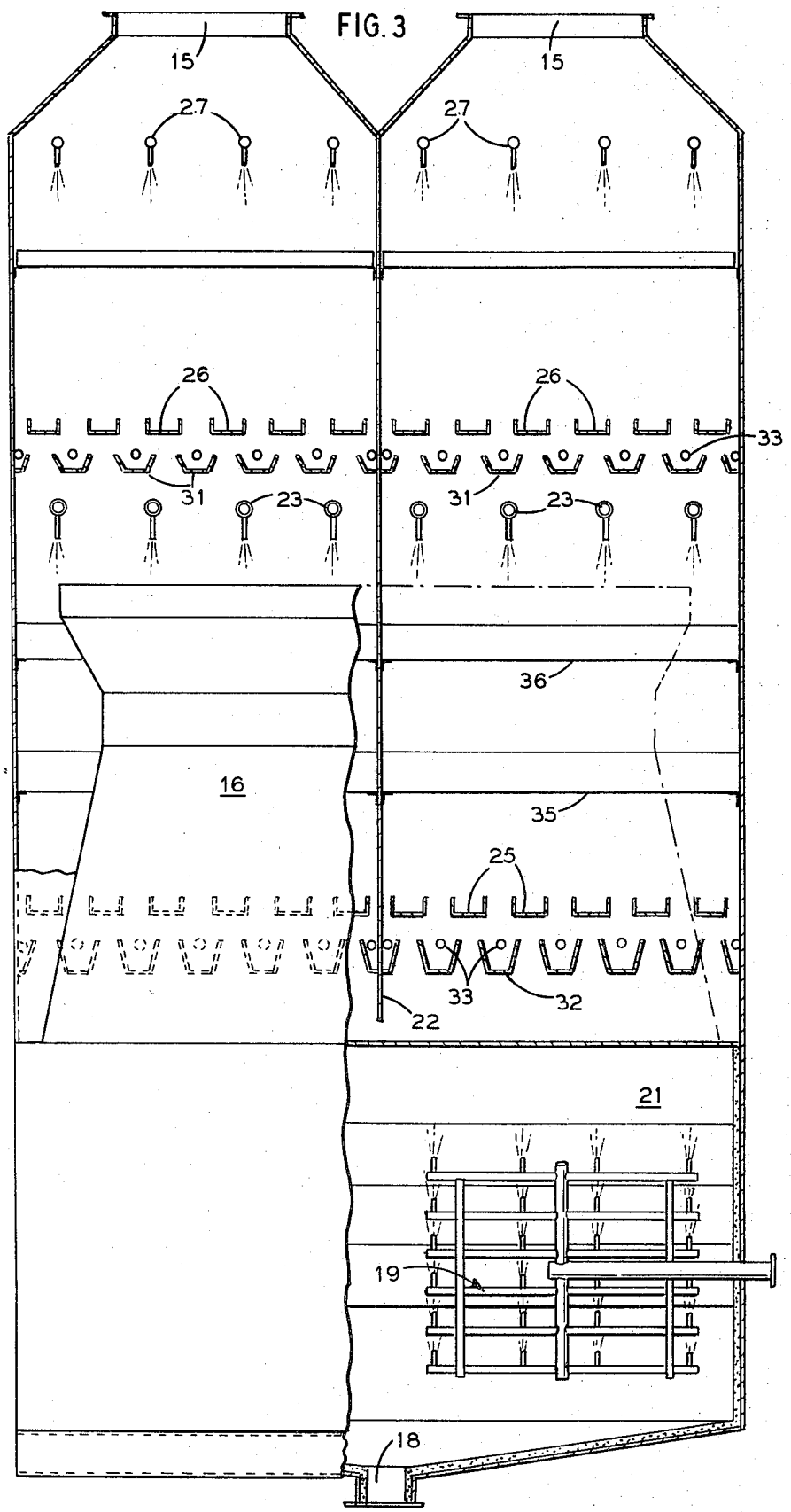

ABSORPTION OPTIMIZATION APPARATUS

The present invention relates to apparatus for cleaning flue gas, and more particularly to systems for removing entrained dust from the flue gas and removing sulphur oxide gases from the cleaned flue gas by absorption in a liquid.

The problem of cleaning flue gases before discharge to the atmosphere is becoming more important to eliminate a public nuisance. The gases resulting from combustion of solid or liquid fuels contain entrained dust or particulate matter resulting from the non-combustibles or ash in the fuel and sulphur oxides generated by combustion of the sulphur in the fuel. The dust may be removed by dry methods, such as electrical (electrostatic) or mechanical (bag collectors or the like), or by wet methods involving scrubbing with liquid sprays. The choice of wet or dry methods is determined primarily by economic factors.

The sulphur oxide removal is usually accomplished by wet procedures utilizing an aqueous absorbent which will convert the gaseous sulphur oxides to a solid or liquid contained in the wet absorbent material. Some absorbent materials are discarded after absorbing the gaseous sulphur oxides from the flue gas, while other of the absorbent material may be treated to remove the absorbed sulphur in a useable form and to regenerate the material for reuse in the flue gas cleaning procedure.

In the present invention a wet scrubber is utilized for removal of particulate matter from the dust-laden flue gas and to generally saturate the gases. The flue gases are passed downwardly through a gas acceleration throat where they are intimately contacted by a spray of washing liquid with the wetted gas thereafter subjected to reduced flow velocities and changes in direction to remove the wetted particulates by gravitational and centrifugal forces. To aid in further removal of entrained particulates the gases are directed in an upward direction through a droplet removal device which may take the form of a chevron demister. The liquid and removed particulate matter is accumulated in the lower portion of the scrubber for removal therefrom.

The cleaned gases leaving the demister pass upwardly through a tower containing an aqueous absorbent material wherein the gaseous sulphur oxides are removed from the gas before the flue gas is discharged to the atmosphere. The absorbent material containing the absorbed sulphur from the flue gas is collected and discharged from the absorbent tower separately from the particulate containing liquid so that the former may be processed with a minimum of particulate contamination for recovery of sulphur in a useable form and the recycle of regenerated absorbent material to the absorbing tower.

FIGS. 2 and 3 are enlarged views, partly in section, showing end and side elevations of a module constructed in accordance with the present invention;

Figure 1:
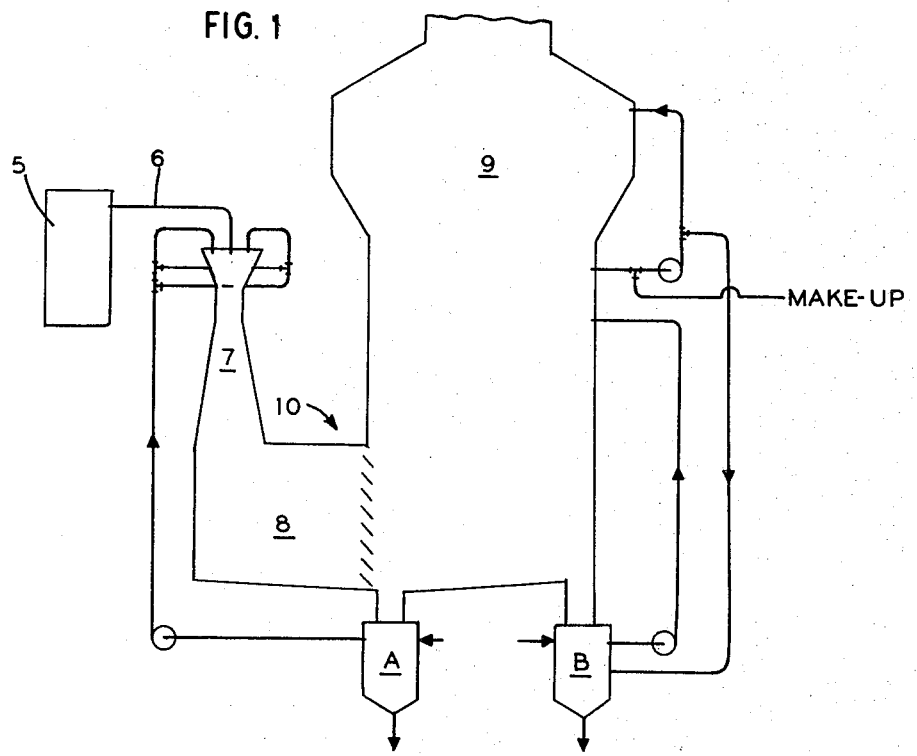
FIG. 1 is schematic illustration of a gas cleaning module, constructed and arranged in accordance with the present invention.

In the illustrated embodiment of the invention, the diagrammatic showing of FIG. 1 illustrates a source of dust-laden flue gases. This source may be an industrial or utility boiler 5, for example, fired by a solid fuel such as pulverized coal, or fuel oil. With either fuel, the flue gases leaving the source 5 and passing through the duct 6 will contain entrained solid matter such as non-combustible ash, as well as sulphur oxides and other gaseous pollutents. The quantity of entrained solid matter and of $SO_2$ gases in the flue gas will, of course, vary with the fuel, as initially supplied to the combustion zone of the boiler 5.

The gases passing through the duct 6 enter a wet scrubber 7 for washing contact with a washing liquid, pass through a settling chamber 8 for removal of solids and liquids from the gases. The gases thereafter pass upwardly through an absorption tower 9 for removal of gaseous sulphur oxides before the gases are discharged to the atmosphere. Advantageously the scrubber, settling chamber and absorption chamber are constructed as a module 10.

The scrubber 7 and settling chamber 8 are functionally combined to remove the particulate matter from the flue gas with the separated solids and liquids removed from the module to an external tank A for recirculation of liquid to the scrubber 7 and removal of collected ash to discard. Make up liquid and chemicals, as required, may be added to the tank A.

The tower 9 may be provided to include absorption elements of many known constructions, such as for example the design shown in Douglas U.S. Pat. No. 3,350,075 or a packed tower utilizing Raschig rings, or the like. However, as hereinafter described, we illustrate a simple perforated plate type of absorber construction which utilizes a system described and claimed in copending application Ser. No. 312424 filed Dec. 5, 1972. With countercurrent contact between gas and liquid absorbent we provide an arrangement of open top troughs to collect the spent absorbent material for separate discharge to a tank B. From this tank the liquid absorbent may be divided for recirculation to the absorber elements and for transfer to further processing equipment or discard, as desired. Make up liquid and chemical may be added to the tank B as required. The tower 9 may also be provided with gas washing and liquid droplet separating means as hereinafter described and shown schematically in FIG. 1.

Figure 2:
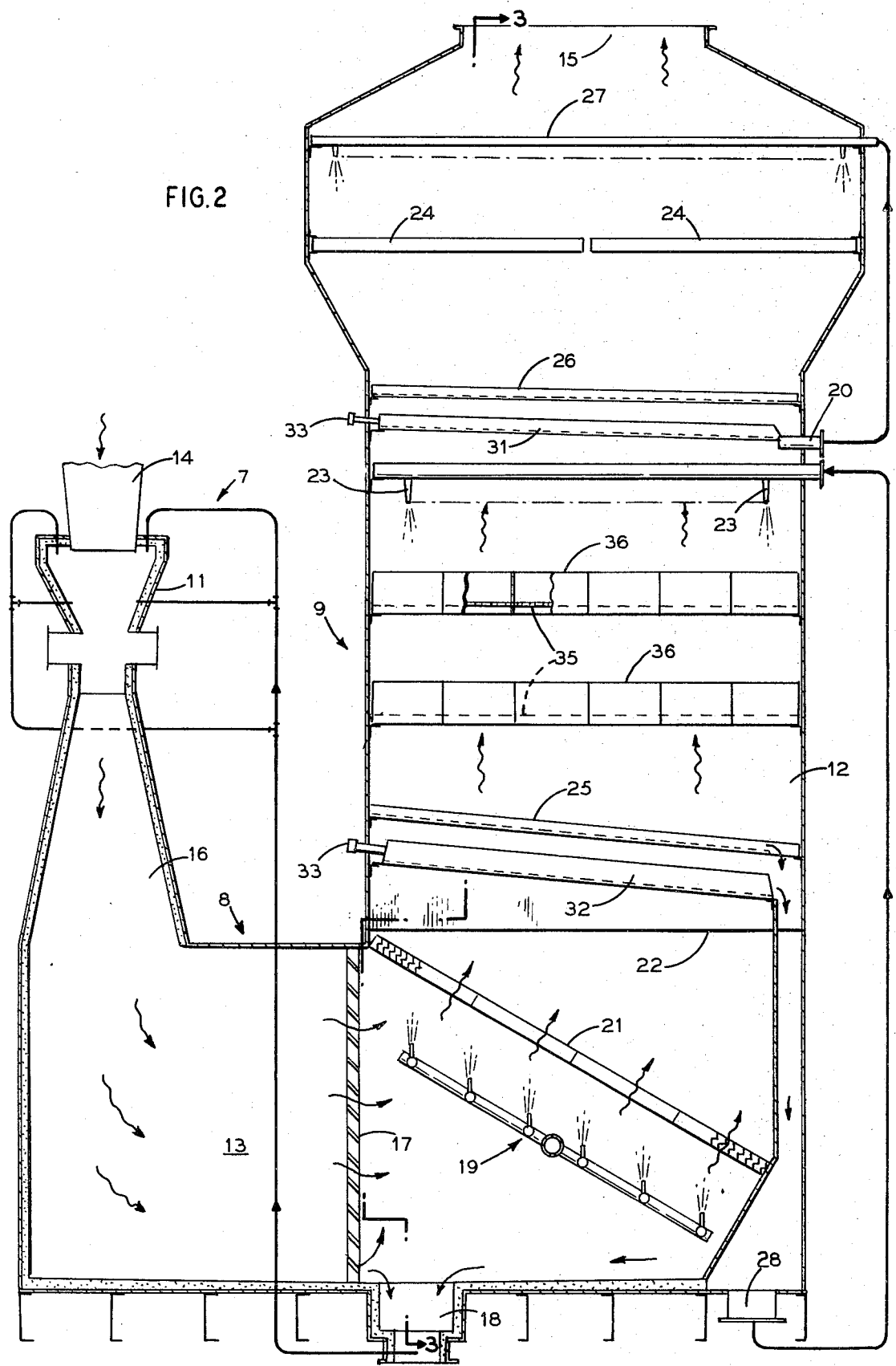

As shown particularly in FIGS. 2 and 3, flue gas enters the scrubber 7 through a nozzle section 14 from duct 6 where a sprayed slurry, introduced above the restricted throat 11, wets the particulate in the flue gas and agglomerates it by inertial impaction. The sprayed slurry may include fly-ash, limestone or some other suitable base, reaction products and water, and it is introduced into the throat through a series of spray nozzles positioned in opposite walls of the scrubber 7. The amount of base (such as limestone, soda ash, or MgO) added to the venturi system is greater than the stoichiometric amount of $SO_3$ in the flue gas. This is added to keep the pH of the slurry from getting too low and corroding the equipment. Slurry is also employed as a wall wash on the convergent section to present a wetted wall for the incoming, hot flue gas.

The effluent discharges from the throat 11 through a diverging section 16 into a low velocity sump or settling chamber 8 where the agglomerated slurry and particulates are separated from the flue gas. The bottom of the sump is sloped to allow drainage of the slurry with its entrained ash through a drain opening 18 leading to the tank A (of FIG. 1).

Intermediate the absorption tower 9 and the scrubber 7 lies an upright deflector 17 which is constructed with a plurality of vertically spaced blades inclined downwardly in the direction of gas flow. The deflector extends across the chamber 8 at the exit of a chamber portion 13 and is located adjacent the front of the drain opening 18 in the sump, as shown. The deflector 17 further aids in removal of the suspended solids and dissolved solids contained in the liquid droplets entrained in the gas passing from the throat 11, the diverging section 16 and the chamber portion 13.

A chevron demister 21 of a known nested V-shape variety lies across the bottom portion of the absorption tower. The demister is inclined downwardly across the intersection of the tower 9 and the separation chamber 8 to further aid in the removal of droplets entrained with the flue gas. Each section of the demister is washed intermittently by a spray nozzle wash system 19 to remove any solid buildup on the demister. The slurry resulting from washing the demister combines with the slurry previously separated from the gas and leaves the sump through the bottom opening 18.

The substantially dust-free flue gas passes through the demister 21 and upwardly through a row of transversely spaced troughs 32, then through an upwardly spaced second row of troughs 25. After such the gaseous mass passes upwardly through a pair of vertically spaced perforated plates 35. A greater or lesser numbers of plates 35 may be used, depending on circumstances.

As shown particularly in FIG. 3, the row of troughs 32 are of trapazoidal cross-section having an open top, while the troughs 25 are of generally U-shaped cross-section and also have an open top. The rows of troughs 25 and 32 are arranged in staggered overlapping relation and are horizontally inclined so that the open tops of the troughs intercept the streams of absorbing liquid gravitationally discharging from the lowermost perforated plate 35 and transfer the collected liquid to a discharge opening 28.

In the arrangement shown some of the absorbent liquid discharged downwardly from the absorbent spray nozzles 23 is collected in the secondary trough 25 while the balance of the liquid is collected in the primary trough 32. With the liquid gravitationally delivered to the opening 28 the collection of absorber liquid is separate from the slurry discharged through opening 18.

Each of the perforated plates 35 is horizontally disposed and has a surface provided with openings which affords slurry holdup and residence time sufficient to substantially complete absorption of the desired gaseous components. Also, the use of such perforated plates eliminates the use of packing.

Figure 4:
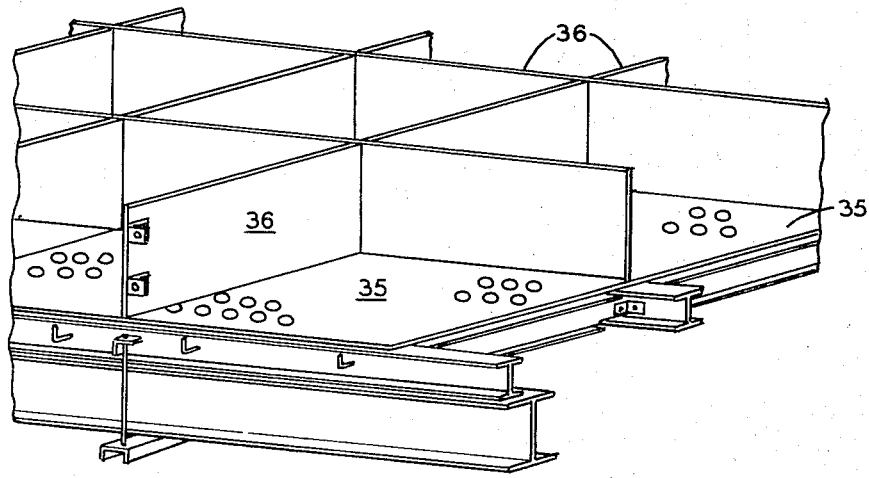
FIG. 4 is a further enlarged perspective view of a portion of the apparatus shown in FIGS. 2 and 3.

As shown in the drawings, and particularly in FIG. 4, each of the plates 35 is provided with upright partitions 36 in the shape of egg-crate type baffles which define a plurality of compartments of generally equal area. The plates 35 are perforated with a plurality of openings in each compartment, where the total opening area is equal to 30 to 40 percent of the total plate area. Ordinarily, the area of the plate forming the bottom of each compartment will represent several square feet, and the compartments are generally equal in area. The arrangement of compartments cooperate with nozzles 23 to provide a uniform liquid level across the surface of the perforated plates 35.

The gas passing upwardly through the absorbent spray nozzle system 23 continues through rows of horizontally inclined troughs 31 and troughs 26 which lie in over-lapping spaced relationship across the tower 9, similar to the arrangement described in connection with troughs 25 and 32. The liquid collected in troughs 26 and 31 is withdrawn from outlet 20 with some of the liquid recirculated to spray nozzles 27 and some of the liquid discharged to tank B, for example, as shown in FIG. 1.

The gases passing upwardly through the rows of troughs 26 and 31 encounter downwardly flowing streams of wash water, and then pass through a chevron type demister 24 which is intermittently or continuously washed by liquid directed downwardly thereover by nozzles 27.

The top of the tower 9 is provided with a pair of openings 15 which are connected with dampered flues (not shown) to transport the gas to the stack. Connections 33 in the side of the tower 9 permit wash down of the diaphragm troughs (31 and 32), when necessary.

In the arrangement described, the module including the scrubber, the settling chamber and the absorber occupied a floor area of approximately 30 by 25 feet, and had a maximum height of 50 feet. In this arrangement the throat had a cross-sectional flow area of $2 \times 18$ feet, and the absorber cross-section (insofar as gas flow is concerned) of $16 \times 24$ feet. Such a module is capable of handling 300,000 to 400,000 C.F.M. at approximately 350°F to remove a major portion of entrained dust or particulate matter and to remove the gaseous $SO_2$ contained in the flue gases. In general terms the module is capable of handling the effluent from a power boiler equivalent to about 100 MW capacity when fired by fuel oil or pulverized coal.

What is claimed is:

1. A gas cleaning module for dust-laden flue gas containing gaseous sulphur oxides, the module including an upright wet scrubber for solids removal connected with a horizontally spaced upright $SO_2$ absorber by a separating chamber receiving gas from the scrubber and passing substantially dust free saturated flue gas to the $SO_2$ absorber, nozzle means for injecting a first liquid spray into the gases passing through said wet scrubber, an upright deflector having downwardly inclined blades positioned in the separating chamber, a demister positioned in the lower portion of the absorber communicating with the separating chamber downstream of the deflector to remove moisture from the gases passing from the wet scrubber into the absorber, spray nozzles positioned adjacent the demister to wash the demister, means for recirculating liquid and solids from the separating chamber to the nozzle means, nozzles positioned in the upper portion of said absorber for discharging a second liquid spray downwardly into the gases flowing upwardly through the absorber, collecting means positioned within and communicating beneath the absorber to receive and discharge the second liquid after passing through the absorber substantially spearately from the first liquid.

2. A gas cleaning module according to claim 1 wherein the bottom of said chamber is horizontally inclined in a downward direction to a low point intermediate its horizontal dimension, and means define an outlet from the low point for discharge of dust agglomerated with said first liquid separated from the flue gas.

3. A gas cleaning module according to claim 1 wherein the collecting means beneath the absorber comprises a first row of horizontally spaced liquid collecting channels extending transversely across the gas flow path, said channels being inclined for liquid discharge at one end thereof, a second row of horizontally spaced liquid collecting channels extending transversely across the gas flow path spaced above said first row and in staggered relationship thereto.

4. A gas cleaning module according to claim 1 wherein said absorber comprises a series of vertically spaced gas-liquid contact zones.

5. A gas cleaning module according to claim 4 wherein a demister is positioned above the absorber to remove entrained moisture from the gas leaving the module.

6. A gas cleaning module according to claim 1 wherein said scrubber includes an accelerating throat with the nozzle means for said first liquid positioned in a converging duct portion opening to the throat.

7. A gas cleaning module according to claim 6 wherein a downwardly diverging duct opens from said throat and connects with the separating chamber, and the separating chamber is horizontally elongated with the flue gases changing direction in passing therethrough.

* * * * *